United States Patent [19]

Borom et al.

[11] Patent Number: 5,015,540

[45] Date of Patent: May 14, 1991

[54] FIBER-CONTAINING COMPOSITE

[75] Inventors: Marcus P. Borom, Schenectady; William B. Hillig, Ballston Lake; Raj N. Singh, Schenectady; William A. Morrison, Albany; Leonard V. Interrante, Schenectady, all of N.Y.

[73] Assignee: General Electric Company, Schenectady, N.Y.

[21] Appl. No.: 56,516

[22] Filed: Jun. 1, 1987

[51] Int. Cl.$^5$ .............................. B32B 9/00
[52] U.S. Cl. ............................ 428/698; 264/332; 428/323; 428/325; 428/361; 428/366; 428/367; 428/375; 428/376; 428/408; 428/699; 428/902; 501/92
[58] Field of Search ........... 428/408, 698, 902, 699, 428/323, 325, 361, 366, 367, 375, 378; 264/332; 501/92

[56] References Cited

U.S. PATENT DOCUMENTS

| | | | |
|---|---|---|---|
| 3,556,836 | 1/1971 | Basche et al. | 428/902 X |
| 3,565,683 | 2/1971 | Morelock . | |
| 3,788,893 | 1/1974 | Morelock . | |
| 4,109,050 | 8/1978 | Mehan et al. | 428/698 X |
| 4,120,731 | 10/1978 | Hillig et al. | 428/698 X |
| 4,141,948 | 2/1979 | Laskow et al. . | |
| 4,148,894 | 4/1979 | Hillig et al. | 428/698 X |
| 4,220,455 | 9/1980 | St. Pierre et al. . | |
| 4,247,304 | 1/1981 | Morelock . | |
| 4,321,154 | 3/1982 | Ledru | 428/902 X |
| 4,401,443 | 8/1983 | Lee et al. | 51/307 |
| 4,485,179 | 11/1984 | Brennan et al. | 428/698 X |
| 4,507,354 | 3/1985 | Shikawa et al. | 428/698 X |
| 4,536,449 | 8/1985 | Kennedy et al. | 428/698 X |
| 4,559,270 | 12/1985 | Sara | 428/408 |
| 4,582,751 | 4/1986 | Vasilos et al. | 428/408 X |
| 4,636,480 | 1/1987 | Hillig | 501/87 |
| 4,640,899 | 2/1987 | Hillig | 501/87 |
| 4,642,271 | 2/1987 | Rice . | |
| 4,725,567 | 2/1988 | Hillig | 501/88 |
| 4,737,328 | 4/1988 | Morelock | 264/62 |
| 4,737,476 | 4/1988 | Hillig | 501/87 |
| 4,752,503 | 6/1988 | Thebault | 427/248.1 |
| 4,769,349 | 9/1988 | Hillig et al. | 501/95 |
| 4,781,993 | 11/1988 | Bhatt | 501/95 |
| 4,788,162 | 11/1988 | Hillig | 501/5 |
| 4,793,859 | 12/1988 | Morelock | 75/245 |
| 4,810,442 | 3/1989 | Hillig et al. | 501/95 |

FOREIGN PATENT DOCUMENTS

| | | | |
|---|---|---|---|
| 0209320 | 1/1987 | European Pat. Off. . | |
| 0078984 | 5/1984 | Japan | 428/698 |

OTHER PUBLICATIONS

Hannache et al., "Boron Nitride Chemical Vapour Infiltration of Fibrous Materials from BCl—3NH—3H—2 or BF—3NH—3 Mixtures: A Thermodynamic and Experimental Approach", Journal of the Less-Common Metals, 95 (1983) pp. 221-246.

R. N. Singh & M. K. Brun, "Effect of Boron Nitride Coating on Fiber-Matrix Interaction", GE-87CRD051, Apr. 1987.

Abstract 22-C-87C "The Interface Between SiC Filaments and Silicon", H. T. Godard and K. T. Faber, Ceramics Bulletin, vol. 65, No. 11, Nov., 1986.

R. N. Singh & A. R. Gaddipati, "Mechanical Properties of a Uniaxially Reinforced Mullite-Silicon Carbide Composite", GE-87CRD120, Jun. 1987.

*Primary Examiner*—Stephen J. Lechert, Jr.
*Assistant Examiner*—Eric Jorgensen
*Attorney, Agent, or Firm*—Jane M. Binkowski; James C. Davis, Jr.; James Magee, Jr.

[57] ABSTRACT

Fibrous material is coated with boron nitride and a silicon-wettable material, the coated fibrous material is admixed with an infiltration-promoting material which is at least partly elemental carbon and the mixture is formed into a preform which is infiltrated with molten silicon producing a composite containing boron nitride coated fibrous material.

54 Claims, No Drawings

FIBER-CONTAINING COMPOSITE

This invention relates to the production of a composite containing boron nitride-coated fibrous material in a matrix containing phases of silicon carbide and elemental silicon.

U.S. Pat. Nos. 4,120,731; 4,141,948; 4,148,894; 4,220,455; 4,238,433; 4,240,835; 4,242,106; 4,247,304, 4,353,953 and 4,626,516; assigned to the assignee hereof and incorporated herein by reference, disclose silicon infiltration of materials which include carbon, molybdenum, carbon-coated diamond and/or cubic boron nitride, and blends of carbon with silicon carbide, boron nitride, silicon nitride, aluminum oxide, magnesium oxide and zirconium oxide.

Many efforts have been extended to produce fiber reinforced, high temperature materials. Structures of carbon fiber reinforced carbon matrices (carbon-carbon or C/C composites) have been used in aircraft construction but they have the disadvantage of poor to no oxidation resistance (i.e. they burn). High strength carbon fibers were infiltrated with molten silicon with the hope that the silicon matrix would protect the carbon filaments. However, the carbon filaments converted instead into relatively weak, irregular columns of SiC crystals resulting in composites with low toughness and relatively modest strength.

As an alternative approach, attempts have been made to incorporate SiC type fibrous material in a silicon matrix by the process of silicon infiltration. There are a number of problems when silicon carbide fibrous material is infiltrated with silicon. Even though SiC has limited solubility in molten silicon, this solubility leads to transport and recrystallization of SiC thereby causing the SiC fibers to lose substantial strength. Also, silicon carbide forms a strong bond with silicon which results in brittle fracture of the composite.

The present process utilizes silicon infiltration of a preform containing carbon and/or silicon carbide fibrous material to produce a composite in which the fibrous material has not been significantly deleteriously affected by processing conditions. In the present process, boron nitride, which is coated on the fibrous material, bars any significant contact of the fibrous material with the infiltrating silicon. Since boron nitride is not wettable by silicon, a coating of a silicon-wettable material is deposited on the boron nitride coating. Materials, which include elemental carbon, are admixed with the coated fibrous material preferably to strengthen the preform, enhance infiltration and provide dispersion strengthening for the matrix, the mixture is formed into a preform, and silicon is infiltrated into the preform to produce the present composite.

Briefly stated, the present process for producing a composite with a porosity of less than about 20% by volume comprised of, based on the volume of the composite, a coated fibrous material of which the fibrous material component comprises at least about 5% by volume, at least about 5% by volume of silicon carbide formed in situ and at least about 1% by volume of elemental silicon, comprises the following steps:

(a) depositing boron nitride on a fibrous material producing a coating thereon which leaves no significant portion of said fibrous material exposed, said fibrous material being selected from the group consisting of elemental carbon, a substance containing at least about 50% by weight silicon and at least about 25% by weight carbon, and a combination thereof;

(b) depositing a silicon-wettable material on said boron nitride-coated fibrous material producing a coating thereon which leaves no significant portion of said boron nitride exposed, said silicon-wettable material adhering to boron nitride sufficiently to form said coating thereon and being wetted by silicon sufficiently to produce said composite;

(c) admixing an infiltration-promoting material containing elemental carbon with the resulting coated fibrous material producing a mixture wherein the fibrous material component of said coated fibrous material comprises at least about 5% by volume of said mixture, (d) forming said mixture into a preform having an open porosity ranging from about 25% by volume to about 90% by volume of the preform;

(e) contacting said preform with silicon-associated infiltrating means whereby said silicon is infiltrated into said preform;

(f) heating the resulting structure in a partial vacuum to a temperature at which said silicon is molten and infiltrating said molten silicon into said preform to produce an infiltrated product having the composition of said composite, said preform containing sufficient elemental carbon to react with said silicon to form said composite, said partial vacuum being at least sufficient to remove gas from said preform so as to allow said molten silicon to infiltrate said preform; and (g) cooling said product to produce said composite.

As used herein "elemental carbon" or "carbon" includes all forms of elemental carbon including graphite.

As used herein "fibrous material" includes fibers, filaments, whiskers, cloth, felt and a combination thereof.

Reference herein to a fibrous material of silicon carbides, includes, among others, presently available materials wherein silicon carbide envelops a core, and which generally are produced by chemical vapor deposition of silicon carbide on a core such as, for example, elemental carbon or tungsten.

In the present invention, the fibrous material to be coated with boron nitride can be amorphous, crystalline or a mixture thereof. The crystalline fibrous material can be single crystal and/or polycrystalline. The fibrous material to be coated with boron nitride is selected from the group consisting of elemental carbon, a SiC-containing material and a combination thereof. The SiC-containing material contains at least about 50% by weight of silicon and at least about 25% by weight of carbon, based on the weight of the material. Examples of SiC-containing materials are silicon carbide, Si—C—O, Si—C—O—N, Si—C—O—Metal and Si—C—O—N—Metal where the Metal component can vary but frequently is Ti or Zr. There are processes known in the art which use organic precursors to produce Si—C containing fibers which may introduce a wide variety of elements into the fibers.

The fibrous material to be coated with boron nitride is stable at the temperature of the present process. Also, this fibrous material preferably has at room temperature, i.e. about 22° C., in air a minimum tensile strength of about 100,000 psi and a minimum tensile modulus of about 25 million psi. Preferably, the carbon fiber is a high strength, high modulus fiber such as derived from the pyrolysis of rayon, polyacrylonitrile or pitch.

The present fibrous material can be used as continuous filament. Alternatively, it can be used as discontinuous fibers, which frequently have an aspect ratio of at least 10, and in one embodiment it is higher than 50, and yet in another embodiment it is higher than 1000. Generally, in a random mixing mode, low aspect ratio fibers are preferred since they pack better and produce high density performs. On the other hand, generally in an ordered array, high aspect ratio fibers are preferred since they produce composites with the highest density of reinforcement and the best mechanical properties. Generally, the present fibers range from about 0.3 micron to about 150 microns in diameter, and from about 10 microns to about 10 centimeters in length or longer. Frequently, the fiber is continuous and as long as desired.

Continuous fibers can be filament-wound to form a cylindrical tube. They can also be formed into sheets by placing long lengths of fiber next to and parallel to one another. Such sheets can consist of single or multiple layers of filaments. Continuous filaments can also be woven, braided, or otherwise arrayed into desired configurations. When fibers are continuous or very long the use of the term "aspect ratio" is no longer useful.

In one embodiment, fibers frequently have a diameter greater than about 5 microns or greater than about 10 microns, and are as long as desired for producing the preform. Frequently, each fiber is longer than about 1000 microns or longer than about 2000 microns.

In carrying out the present process, boron nitride is coated on the fibrous material to produce a coating thereon which leaves at least no significant portion of the fibrous material exposed, and preferably, the entire material is coated with boron nitride. Preferably the entire wall of each individual fiber is totally coated with boron nitride leaving none of the wall exposed. The ends of the fiber may be exposed but such exposure is not considered significant. Most preferably, the entire fiber is totally enveloped, i.e. encapsulated, with a coating of boron nitride. The boron nitride coating should be continuous, free of any significant porosity and preferably it is porefree. Preferably, the boron nitride coating is uniform or at least significantly uniform.

The boron nitride coating can be deposited on the fibrous material by a number of known techniques under conditions which have no significant deleterious effect on the material. Generally, the boron nitride coating can be deposited by chemical vapor deposition by reactions such as:

$$B_3N_3H_6(g) \rightarrow 3BN(s) + 3H_2(g) \quad (1)$$

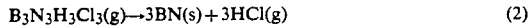

$$B_3N_3H_3Cl_3(g) \rightarrow 3BN(s) + 3HCl(g) \quad (2)$$

$$BCl_3(g) + NH_3(g) \rightarrow BN(s) + 3HCl(g) \quad (3)$$

Generally, the chemical vapor deposition of boron nitride is carried out at temperatures ranging from about 900° C. to 1800° C. in a partial vacuum, with the particular processing conditions being known in the art or determinable empirically.

The boron nitride coating should be at least sufficiently thick to be continuous and free of significant porosity. Generally, its thickness ranges from about 0.3 microns to about 5 microns, and typically it is about 0.5 microns. The particular thickness of the coating is determinable empirically, i.e. it should be sufficient to prevent reaction, or prevent significant reaction, between the fibrous material and the infiltrating silicon under the particular processing conditions used. During the infiltration process, the boron nitride coating may or may not react with or dissolve in the molten silicon depending on time and temperature, i.e. the boron nitride coating will survive better at lower temperatures and/or shorter times. Generally, silicon infiltration time increases with the size of the preform. Larger-sized preforms, therefore, are more likely to require thicker boron nitride coatings.

A number of techniques can be used to determine if the boron nitride coating survived. For example, if the composite exhibits fiber pull-out on fracture, then the boron nitride coating has survived. Also, scanning electron microscopy of a cross-section of the present composite can detect a boron nitride coating on the fibrous material.

The boron nitride-coated material is then coated with a silicon-wettable material leaving no significant portion of the boron nitride exposed, and preferably leaving none of the boron nitride coating exposed. Most preferably, the coating of silicon-wettable material totally envelops, i.e., encapsulates, the boron nitride-coated material. Specifically, the coating of silicon-wettable material should be free of significant porosity and preferably is pore-free. Also, preferably, the coating is uniform or at least significantly uniform. Generally, the thickness of the coating of silicon-wettable material ranges from about 500 Angstroms to about 3 microns, and typically it is about 0.5 microns. The particular thickness of the coating is determinable empirically and depends largely on the rate of consumption of the coating, if any, and the particular composite desired.

The silicon-wettable material is a solid which covers the boron nitride and adheres sufficiently to form the present coating thereon. Also, throughout the present process it remains a solid. The silicon-wettable material should be sufficiently wetted by the infiltrating silicon to enable the production of the present composite having a porosity of less than about 20% by volume. The infiltrating silicon should have a contact or wetting angle against the silicon-wettable material of less than 90 degrees to allow the infiltration to occur by capillarity.

Representative of useful silicon-wettable materials is elemental carbon, metal carbide, a metal which reacts with silicon to form a silicide, a metal nitride such as silicon nitride, and a metal silicide. Elemental carbon is preferred and usually, it is deposited on the boron nitride-coated material in the form of pyrolytic carbon. Generally, the metal carbide is a carbide of silicon, tantalum, titanium or tungsten. Generally, the metal silicide is a silicide of chromium, molybdenum, tantalum, titanium, tungsten and zirconium.

The metal which reacts with silicon to form a silicide thereof as well as the silicide must have melting points higher than the melting point of silicon and preferably higher than about 1450° C. Generally, the metal and silicide thereof are solid in the present process. Representative of such metals is chromium, molybdenum, tantalum, titanium and tungsten.

Known techniques can be used to deposit the coating of silicon-wettable material which generally is deposited by chemical vapor deposition using low pressure techniques.

The metal carbide or metal silicide coating can be directly deposited from the vapor thereof. Alternatively, the metal carbide coating can be formed in situ by initially depositing carbon followed by depositing metal thereon under conditions which form the metal carbide. If desired, metal silicide coating can be produced by initially depositing the metal followed by deposition of silicon under conditions which form the metal silicide.

An infiltration-promoting material is admixed with the resulting coated fibrous material to produce the desired mixture. The infiltration-promoting material is a material which is wetted by molten silicon. The infiltration-promoting material as well as any reaction product thereof produced in the present process should not flow to any significant extent and preferably is solid in the present process. Also, the infiltration-promoting material should have no significant deleterious effect on the present process or the resulting composite. The particular composition of the infiltration-promoting material is determinable empirically and depends largely on the particular composite desired, i.e. the particular properties desired in the composite. However, the infiltration-promoting material always contains sufficient elemental carbon to enable the production of the present composite. Specifically, the preform should contain sufficient elemental carbon, generally most or all of which may be provided by the infiltration-promoting material and some of which may be provided as a coating on the boron nitride-coated material, to react with the infiltrating silicon to produce the present composite containing silicon carbide formed in situ in an amount of at least about 5% by volume of the composite. Generally, elemental carbon ranges from about 5% by volume, or from about 10% or 20% by volume, to about 100% by volume, of the infiltration-promoting material.

The infiltration-promoting material also may include a metal, generally in an amount of at least about 1% by volume of the infiltration-promoting material, which reacts with elemental silicon in the present process to form a silicide. Representative of such a metal is chromium, molybdenum, tantalum, titanium, tungsten and zirconium.

The infiltration-promoting material may also include a ceramic material, generally in an amount of at least about 1% by volume of the infiltration-promoting material, which may or may not react with silicon such as a ceramic carbide, a ceramic nitride or a ceramic silicide. The ceramic carbide is selected from the group consisting of boron carbide, molybdenum carbide, niobium carbide, silicon carbide and titanium carbide. The ceramic nitride is selected from the group consisting of aluminum nitride, niobium nitride, silicon nitride, titanium nitride and zirconium nitride. The ceramic silicide is selected from the group consisting of chromium silicide, molybdenum silicide, tantalum silicide, titanium silicide, tungsten silicide and zirconium silicide.

The infiltration-promoting material can be in the form of a powder, a fibrous material or a combination thereof. When the infiltration-promoting material is in the form of a powder, it preferably has an average particle size of less than about 50 microns, more preferably less than about 10 microns. The amount and type of infiltration-promoting material depends largely on the particular composite desired and is determinable empirically.

The infiltration-promoting material should be admixed with the coated fibrous material in a manner which will not have a significantly deleterious effect on the coatings of silicon-wettable material and boron nitride. Mixing can be carried out in a known and conventional manner. In one embodiment, a slurry of the infiltration-promoting material can be deposited through the coated material to form a mixture. The slurry can be an organic slurry containing known bonding means, such as for example epoxy resin, to aid in forming the preform.

The mixture can be formed or shaped into a preform or compact by a number of known techniques. For example, it can be extruded, injection molded, die-pressed, isostatically pressed or slip cast to produce the preform of desired size and shape. Preferably, the preform is of the size and shape desired of the composite. Generally, there is no significant difference in dimension between the preform and the resulting composite. Any lubricants, binders, or similar materials used in shaping the mixture should have no significant deleterious effect in the present process. Such materials are of the type which evaporate on heating at temperatures below the present infiltration temperature, preferably below 500° C., leaving no deleterious residue.

Generally, the present preform has an open porosity ranging from about 25% by volume to about 90% by volume of the preform, and the particular amount of such open porosity depends largely on the particular composite desired. Frequently, the preform has an open porosity ranging from about 35% by volume to about 80% by volume, or from about 40% by volume to about 60% by volume, of the preform. By open porosity of the preform, it is meant herein pores, voids or channels which are open to the surface of the preform thereby making the interior surfaces accessible to the ambient atmosphere or the infiltrant.

Generally, the preform has no closed porosity. By closed porosity it is meant herein closed pores or voids, i.e. pores not open to the surface of the preform and therefore not in contact with the ambient atmosphere.

Void or pore content, i.e. both open and closed porosity, can be determined by standard physical and metallographic techniques.

Preferably, the pores in the preform are small, preferably ranging from about 0.1 micron and about 50 microns, and at least significantly or substantially uniformly distributed through the preform thereby enabling the production of a composite wherein the matrix phase is at least significantly or substantially uniformly distributed through the composite. Also, this would produce a composite wherein the matrix phase has a thickness between the fibers ranging from about 0.1 micron to about 50 microns.

In carrying out the present process, the preform is contacted with silicon-associated infiltrating means whereby silicon is infiltrated into the preform. The infiltrating means allow silicon to be infiltrated into the preform. For example, a structure or assembly is formed comprised of the preform in contact with means that are in contact with silicon and which permit infiltration of molten silicon into the preform. In one infiltration technique, the preform is placed on a woven cloth of elemental carbon, a piece of silicon is also placed on the cloth, and the resulting structure is heated to infiltration temperature. At infiltration temperature, the molten silicon migrates along the cloth and wicks into the preform. After infiltration, the wicking carbon cloth may be removed from the composite by diamond grinding.

In another technique, the silicon infiltration procedure can be carried out as set forth in U.S. Pat. No. 4,626,516 which discloses an assembly that includes a mold with infiltration holes and a reservoir holding elemental silicon. The preform is placed within the mold and carbon wicks are provided in the infiltrating holes. The wicks are in contact with the preform and also with the silicon and at infiltration temperature the molten silicon migrates along the wicks into the preform.

Copending Ser. No. 759,814 filed Jul. 29, 1985, for INFILTRATION OF MATERIAL WITH SILICON, by C. R. Morelock, assigned to the assignee hereof and incorporated herein by reference, discloses another infiltration technique which comprises contacting the preform with a powder mixture composed of silicon and hexagonal boron nitride, heating the resulting structure to a temperature at which the silicon is fluid and infiltrating the fluid silicon into the preform. After infiltration, the resulting porous hexagonal boron nitride powder is brushed off the composite.

The present structure or assembly is heated to infiltration temperature in a nonoxidizing partial vacuum wherein the residual gases have no significantly deleterious effect on said structure or assembly and the present infiltration is carried out in such nonoxidizing partial vacuum. Preferably, such nonoxidizing partial vacuum is provided before heating is initiated. The partial vacuum should be at least sufficient to avoid the entrapment of pockets of gas which would lead to excessive porosity, i.e. it should be sufficient to produce the present composite. Generally, such a partial vacuum ranges from about 0.01 torr to about 2 torr, and usually from about 0.01 torr to about 1 torr to insure removal of entrapped gas in the preform being infiltrated.

Ordinarily and as a practical matter, the furnace used is a carbon furnace, i.e. a furnace fabricated from elemental carbon. Such a furnace acts as an oxygen getter for the atmosphere within the furnace reacting with oxygen to produce CO or $CO_2$ and thereby provides a nonoxidizing atmosphere, i.e. the residual gases have no significantly deleterious effect on the infiltrating silicon. The present infiltration cannot be carried out in air because the liquid silicon would oxidize to form a dense silica coating before any significant infusion by silicon occurred. In such instance where a carbon furnace is not used, it is preferable to have an oxygen getter present in the furnace chamber, such as elemental carbon, in order to insure the maintenance of a nonoxidizing atmosphere. Alternatively, other nonoxidizing atmospheres which have no significant deleterious effect on the structure within the furnace can be used at partial vacuums of about $10^{-2}$ torr to 2 torr.

The present infiltration is carried out at a temperature at which silicon is molten and which has no significant deleterious effect on the preform being infiltrated. The present infiltration temperature ranges from a temperature at which the silicon is molten to a temperature at which there is no significant vaporization of the silicon. Molten silicon has a low viscosity. The melting point of the silicon can vary depending largely on the particular impurities which may be present. Generally, the present infiltration temperature ranges from greater than about 1400° C. to about 1550° C., and preferably from about 1450° C. to about 1500° C. The rate of penetration of the silicon into the preform depends on the wetting of the preform by the silicon melt and the fluidity of the melt. With increase in temperature, the ability of the molten silicon to wet the preform improves.

In the present process, sufficient silicon is infiltrated into the preform to produce the present composite. Specifically, the molten silicon is mobile and highly reactive with elemental carbon, i.e. it has an affinity for elemental carbon, wetting it and reacting with it to form silicon carbide. The molten silicon also has an affinity for any metal with which it reacts to form the silicide thereof. In addition, sufficient silicon is infiltrated into the preform to fill pores or voids which may remain to produce the present composite.

The period of time required for infiltration by the silicon is determinable empirically and depends largely on the size of the preform and extent of infiltration required. Generally, it is completed in less than about 20 minutes, and often in less than about 10 minutes.

The resulting infiltrated body is cooled in an atmosphere and at a rate which has no significant deleterious effect on it. Preferably it is furnace cooled in the nonoxidizing partial vacuum to about room temperature, and the resulting composite is recovered.

The present composite has a porosity of less than about 20% by volume, preferably less than about 10% or 5% by volume, and more preferably less than about 1% by volume, of the composite. Most preferably, the composite is void- or pore-free or has no significant or no detectable porosity. Preferably, any voids or pores in the composite are small, preferably less than about 50 microns or less than about 10 microns, and significantly or substantially uniformly distributed in the composite. Specifically, any voids or pores are sufficiently uniformly distributed throughout the composite so that they have no significant deleterious effect on its mechanical properties.

The present composite is comprised of boron nitride-coated fibrous material and a matrix phase. The matrix phase is distributed through the boron nitride-coated fibrous material and generally it is substantially completely space filling and usually it is interconnecting. Generally, the boron nitride-coated fibrous material is totally enveloped by the matrix phase. The fibrous material component of the boron nitride-coated fibrous material comprises at least about 5% by volume, or at least about 10% by volume, or at least about 30% by volume of the composite. The matrix phase contains a silicon carbide phase formed in situ in an amount of at least about 5% by volume or at least about 10% by volume, or at least about 30% by volume, or at least about 45% by volume, of the composite, and an elemental silicon phase in an amount of at least about 1% by volume of the composite.

The coated fibrous material in the composite is at least coated with boron nitride which is at least detectable by scanning electron microscopy and generally ranges in thickness from such detectable amount to about 5 microns, frequently from about 0.5 microns to about 1.5 microns. The particular amount of boron nitride in the composite provided by the boron nitride coating depends largely on the amount of coated fibrous material present, the thickness of the boron nitride coating and the diameter of the fiber. Therefore, the volume fraction of boron nitride provided by the coating is the balance of the volume fraction of all other components of the composite. However, in one embodiment, the boron nitride coating on the fibrous material in the composite generally ranges from less than about 1% by volume to about 30% by volume, or from about 1% by volume to about 10% by volume, of the total volume of boron nitride-coated fibrous material. Also, in another embodiment, the boron nitride coating on the fibrous material generally ranges from less than about 1% by volume to about 20% by volume, or from about 1% by volume to about 5% by volume, of the composite.

Generally, the fibrous material component of the boron nitride-coated fibrous material ranges from about 5% by volume to less than about 75% by volume, or from about 10% by volume to about 70% by volume, or from about 15% by volume to less than about 65% by volume, or from about 30% by volume to about 60% by volume, of the composite. Generally, the boron nitride-coated material is distributed through the composite, and most often, it is distributed significantly uniformly through the composite. However, in some cases it is desirable to have higher packing fractions of the boron nitride-coated material in regions of the composite where higher local strength or stiffness may be desired. For example, in a structure having a long thin part, such as a valve stem, it is advantageous to strengthen the stem by increasing the volume fraction of the boron nitride-coated material in the stem region of the structure.

Generally, silicon carbide phase formed in situ ranges from about 5% by volume to about 89% by volume, or from about 10% by volume to about 79% by volume, or from about 30% by volume to about 59% by volume, or from about 45% by volume to about 55% by volume, of the composite. Generally, the silicon carbide phase is distributed through the composite, and preferably, it is distributed significantly uniformly.

Generally, elemental silicon phase ranges from about 1% by volume to about 30% by volume, or to about 10% by volume, or to about 5% by volume, or to about 2% by volume of the composite. In one embodiment, the elemental silicon phase in the composite is free of boron. In another embodiment, it has boron dissolved therein ranging from a detectable amount to less than about 1% by weight of the elemental silicon phase. More sensitive techniques such as microprobe analysis or Auger electron spectroscopy may be required to detect or determine the amount of boron dissolved in the silicon phase. Generally, the elemental silicon phase is distributed through the composite, and preferably, it is distributed significantly uniformly.

The present composite may contain a phase of a ceramic material disclosed as an infiltration-promoting material herein generally ranging up to about 50% by volume, frequently from about 1% by volume to about 30% by volume, of the composite. Generally, the ceramic material is distributed through the composite, and preferably, it is distributed at least significantly uniformly.

The present composite may contain a phase of a metal which forms a silicide but which had not reacted with the infiltrating silicon. In such instance, it would be encapsulated by a metal silicide phase. Such metal generally can range from about 0.5% by volume to about 5% by volume, of the composite. Generally, such metal is distributed through the composite, and preferably, it is distributed at least significantly uniformly.

The matrix of the present composite may contain a phase of elemental carbon which has a significant amount of graphitic structure, i.e. a less reactive type of carbon, which had not completely reacted with the infiltrating silicon. In such instance, this type of carbon would be totally encapsulated by a phase of silicon carbide formed in situ. Such graphitic structure-containing elemental carbon generally can range from about 0.5% by volume to about 10% by volume, frequently from about 1% by volume to about 5% by volume, of the composite. Generally, such graphitic structure-containing elemental carbon is distributed through the composite, and preferably, it is distributed at least significantly uniformly.

The present composite is at least bonded by silicon carbide formed in situ. It may also be bonded by a metal silicide which formed in situ. It may also be bonded by elemental silicon or a bond formed in situ between silicon and a ceramic material.

The bonding of the boron nitride-coated fibrous material in the present composite enables such fibrous material to impart significant toughness to the composite. Specifically, the bonding of the boron nitride-coated fibrous material is of a type which prevents brittle fracture of the composite at room temperature, i.e. 25° C. By brittle fracture of a composite it is meant herein that the entire composite cracks apart at the plane of fracture. In contrast to a brittle fracture, the present composite exhibits fiber pull-out on fracture at room temperature. Specifically, as the present composite cracks open, generally at least about 10% by volume, frequently at least about 50% by volume and preferably all of the boron nitride-coated fibrous material pulls out and does not break at the plane of fracture at room temperature.

One particular advantage of this invention is that the present composite can be produced directly in a wide range of sizes and shapes which heretofore may not have been able to be manufactured or which may have required expensive and tedious machining. For example, the present composite can be as short as about an inch or less, or as long as desired. It can be of simple, complex and/or hollow geometry. For example, it can be produced in the form of a tube or a hollow cylinder, a ring, a sphere or a bar having a sharp point at one end. Also, since the present composite can be produced in a predetermined configuration of predetermined dimensions, it requires little or no machining.

The present composite has a wide range of applications depending largely on its particular composition. It can be used, for example, as a wear resistant part, bearing or tool insert, acoustical part and high-temperature structural components.

The invention is further illustrated by the following example where, unless otherwise stated, the procedure was as follows:

Commercially available filaments of elemental carbon sold under the trademark Magnamite AS4 were used. In air at room temperature these filaments have a tensile strength of about 550 thousand psi and a tensile modulus of about 34 million psi.

The binder was comprised of "Epon 828" which contained a curing agent. "Epon 828" is a resin formed from the reaction of epichlorohydrin and Bisphenol A, which is a liquid at room temperature and which has an epoxide equivalent of 185-192. Epon 828 decomposes completely below 1300° C. The curing agent was diethylenetriamine, a liquid commonly called DTA which cures Epon 828 thereby solidifying it. It was used in an amount of about 10% by weight of Epon 828.

The carbon resistance furnace used to form the composite was contained in a vacuum belljar system.

EXAMPLE 1

Strands of continuous carbon filaments having a length of about 2 inches and a diameter of about 7 μm were placed on a molybdenum screen and coated with boron nitride by the following low pressure chemical vapor deposition process utilizing the reaction $B_3N_3H_3Cl_3 \rightarrow 3BN + 3HCl$.

The molybdenum screen containing the carbon filaments was positioned at about the midpoint of the hot zone of a pyrex/quartz/pyrex furnace tube.

Commercial trichloroborazine ($B_3N_3H_3Cl_3$) was used. A 1.00 gram sample of this solid was transferred in an argon-filled glove box to a pyrex end-section which contained a thermocouple vacuum gauge, a cold trap and a vacuum stopcock.

The closed pyrex end-section was then taken out of the glove box and attached to an end of the furnace tube and to a vacuum system. The end-section containing the trichloroborazine was then cooled using liquid nitrogen and the furnace tube was opened to the vacuum system via the stopcock of the pyrex end-section. After the system reached a pressure lower than 0.020 torr, the furnace was heated to about 1050° C. When the pressure had again dropped below 0.020 torr and the furnace temperature had stabilized, the end-section containing the trichloroborazene was warmed by an oil bath maintained at 60° C., whereupon the solid began to vaporize, depositing BN and liberating gaseous HCl in the hot zone of the furnace tube and producing an increase in pressure.

The pressure was observed to reach as high as about 200 torr before stabilizing at about 50 torr. After two hours, the pressure was found to have decreased to about 0.020 torr, whereupon the furnace was shut down and the system allowed to cool to room temperature before opening the tube and removing the sample.

Identification of the chemically vapor deposited layer as BN was accomplished by means of electrical resistance measurement and a quantitative ESCA analysis of a film deposited in substantially the same manner on a SiC disk surface. This film was amorphous to x-rays in the as-deposited condition and appeared fully dense and smooth at high magnification in the SEM.

Scanning electron microscopy observation of the ends of coated and broken fibers revealed that the coating was continuous and smooth and about 1.5 μm thick on the 7 μm diameter fiber and left no significant portion of the fiber exposed.

The boron nitride-coated fibers were then coated with pyrolytic carbon derived from the cracking of methane gas in a heated furnace. The carbon coating was significantly uniform with a thickness of about 0.5 microns and left no significant portion of the boron nitride coating exposed.

The coated carbon fibers were aligned in a mold and a slurry comprised of 1 part (by weight) crushed carbon felt, 1 part of binder, and 1 part methyl-ethyl-ketone was poured around the aligned fibers. The house vacuum was then applied to the mold which produced a vacuum-cast preform containing coated fibers submerged in the slurry of carbon fibers and binder. This preform was cured overnight in the mold at room temperature and subsequently for an hour at about 100° C. At this point the preform had sufficient strength and could be shaped by machining. The crushed carbon in the preform provided the channels and optimum pore size for rapid infiltration of molten silicon by way of Si—C reaction and wicking. The preform was in the shape of a bar about 0.3"×0.1"×2" and had an open porosity of at least about 50% by volume.

The preform and solid pieces of silicon infiltrant were placed on a woven carbon fabric which was contained in a BN-sprayed graphite tray. This tray was then placed in a carbon resistance heated belljar furnace and slowly heated at a rate of about 10° C. per minute to about 400° C. in a vacuum of about 0.05 torr. The slow heating at this stage assured slow decomposition the binder which otherwise may lead to disintegration of the preform. Subsequent to this, the preform was rapidly heated to 1420° C. at which point the silicon was fluid and reacted with the carbon cloth and wicked into the preform. A considerable amount of heat which was detected by a thermocouple placed on top of the preform was generated due to the exothermic reaction of silicon with carbon fibers in the matrix. The preform was held for 5 minutes under these conditions during which temperatures reached about 1500° C. After this the furnace power was turned off and the infiltrated sample was cooled to room temperature in the vacuum of belljar.

The resulting composite had a porosity of less than about 1% by volume. It was estimated to be comprised of, based on the volume of the composite, of about 70% by volume of silicon carbide phase, about 10% by volume of elemental silicon phase and about 20% by volume of boron nitride coated filaments of carbon of which the carbon filament component comprised about 18% by volume.

The composite was fractured using a standard three point bend test. It showed toughened ceramic-like behavior. On fracture, it exhibited fiber pull-out, i.e. at least about 50% by volume of the boron nitride-coated filaments pulled out. Scanning electron microscopy of the fractured cross-section of the composite showed fiber pull-out and the boron nitride coating intact around the carbon filaments. All of the components of the composite were distributed through the composite.

This composite would be useful as a high temperature structural material in an aircraft engine.

What is claimed is:

1. A process for producing a composite with a porosity of less than about 20% by volume comprised of boron nitride-coated fibrous material and a matrix phase, said fibrous material component of said coated fibrous material comprising at least about 5% by volume of the composite, said matrix phase containing silicon carbide formed in situ in an amount of at least about 5% by volume of the composite and elemental silicon in an amount of at least about 1% by volume of the composite, which comprises the following steps:
   (a) depositing boron nitride on a fibrous material producing a coating thereon which leaves no significant portion of said fibrous material exposed, said fibrous material being selected from the group consisting of elemental carbon, a Si-C containing material containing at least about 50% by weight silicon and at least about 25% by weight carbon, and a combination thereof;
   (b) depositing a silicon-wettable material on said boron nitride-coated fibrous material producing a coating thereon which leaves no significant portion of said boron nitride exposed, said silicon-wettable material adhering to boron nitride sufficiently to form said coating thereon and being wetted by silicon sufficiently to produce said composite;
   (c) admixing an infiltration-promoting material containing elemental carbon with the resulting coated fibrous material producing a mixture wherein the fibrous material component of said coated fibrous material comprises at least about 5% by volume of said mixture;

(d) forming said mixture into a preform having an open porosity ranging from about 25% by volume to about 90% by volume of the preform;

(e) contacting said preform with silicon-associated infiltrating means whereby said silicon is infiltrated into said preform;

(f) heating the resulting structure in a partial vacuum to a temperature at which said silicon is molten and infiltrating said molten silicon into said preform to produce an infiltrated product having the composition of said composite, said preform containing sufficient elemental carbon to react with said silicon to form said composite, said partial vacuum being at least sufficient to remove gas from said preform so as to allow said molten silicon to infiltrate said preform; and (g) cooling said product to produce said composite.

2. The process according to claim 1 wherein said silicon-wettable material is selected from the group consisting of elemental carbon, metal carbide, a metal which reacts with silicon to form a silicide thereof, a metal nitride and a metal silicide.

3. The process according to claim 1 wherein said preform has an open porosity ranging from about 35% by volume to about 80% by volume.

4. The process according to claim 1 wherein said infiltration-promoting material is comprised of elemental carbon.

5. The process according to claim 1, wherein said fibrous material component is comprised of elemental carbon.

6. The process according to claim 1, wherein said fibrous material component is comprised of silicon carbide.

7. The process according to claim 1 wherein said matrix phase is comprised of said silicon carbide formed in situ and said elemental silicon.

8. The process according to claim 1 wherein said fibrous component of said coated fibrous material comprises from about 10% by volume to about 70% by volume of said composite.

9. A composite comprised of boron nitride-coated fibrous material and a matrix phase containing silicon carbide phase and elemental silicon phase, said silicon carbide phase being present in an amount of at least about 5% by volume of said composite, said elemental silicon phase being present in an amount of at least about 1% by volume of said composite, said fibrous material component of said boron nitride-coated material being present in an amount of at least about 5% by volume of said composite, said fibrous material component of said coated fibrous material being selected from the group consisting of elemental carbon, a SiC-containing material containing by weight of the SiC-containing material of least about 50% by weight of silicon and at least about 25% by weight of carbon, and a combination thereof, said boron nitride coating being at least detectable by scanning electron microscopy, said composite having a porosity of less than about 20% by volume.

10. The composite according to claim 9 wherein said silicon carbide phase ranges from about 15% by volume to about 79% by volume of the composite.

11. The composite according to claim 9 wherein said fibrous material component is comprised of elemental carbon.

12. The composite according to claim 9, wherein said fibrous material component is comprised of silicon carbide.

13. The composite according to claim 9 wherein said matrix phase is comprised of said silicon carbide phase and said elemental silicon phase.

14. The composite according to claim 9 wherein said fibrous material component ranges from about 10% by volume to about 70% by volume of said composite.

15. The composite according to claim 9 having a porosity of less than about 10% by volume.

16. The composite according to claim 9 wherein said fibrous material component is in the form of continuous filaments.

17. A composite comprised of boron nitride-coated fibrous material and a matrix phase, said fibrous material component of said boron nitride-coated material being present in an amount ranging from about 10% by volume to about 70% by volume of the composite and being selected from the group consisting of elemental carbon, a SiC-containing material containing by weight of the SiC-containing material at least about 50% by weight of silicon and at least about 25% by weight of carbon, and a combination thereof, said boron nitride coating being at least detectable by scanning electron microscopy, said coated fibrous material being distributed through said composite, said matrix phase being comprised of silicon carbide phase and elemental silicon phase, said silicon carbide phase being present in an amount of at least about 10% by volume of said composite, said elemental silicon phase being present in an amount of at least about 1% by volume of said composite, said matrix phase totally enveloping said boron nitride-coated fibrous material, said composite having a porosity of less than about 20% by volume.

18. The composite according to claim 17 wherein said silicon carbide phase ranges from about 10% by volume to about 70% by volume of said composite.

19. The composite according to claim 17 wherein said fibrous material component ranges from about 15% by volume to less than about 65% by volume of said composite.

20. The composite according to claim 17 wherein said fibrous material component is comprised of elemental carbon.

21. The composite according to claim 17 wherein said fibrous material component is comprised of silicon carbide.

22. The composite according to claim 17 wherein said fibrous material component is comprised of continuous filaments.

23. A process for producing a composite with a porosity of less than about 5% by volume comprised of boron nitride-coated fibrous material and a matrix phase, said fibrous material component of said coated fibrous material comprising at least about 5% by volume of the composite, said matrix phase containing silicon carbide formed in situ in an amount of at least about 5% by volume of the composite and elemental silicon in an amount of at least about 1% by volume of the composite, which comprises the following steps:

(a) depositing boron nitride on a fibrous material producing a coating thereon which leaves no significant portion of said fibrous material exposed, said fibrous material being selected from the group consisting of elemental carbon, a substance containing at least about 50% by weight silicon and at least about 25% by weight carbon, and a combination thereof, (b) depositing a silicon-wettable material on said boron nitride-coated fibrous material producing a coating thereon which leaves no significant portion of said boron nitride exposed, said silicon-wettable material adhering to boron nitride sufficiently to form said coating thereon and being wetted by silicon sufficiently to produce said composite;

(c) admixing an infiltration-promoting material containing elemental carbon with the resulting coated fibrous material producing a mixture wherein the fibrous material component of said coated fibrous material comprises at least about 5% by volume of said mixture;

(d) forming said mixture into a preform having an open porosity ranging from about 35% by volume to about 80% by volume of the preform;

(e) contacting said preform with silicon-associated infiltrating means whereby said silicon is infiltrated into said preform, (f) heating the resulting structure in a partial vacuum to a temperature at which said silicon is molten and infiltrating said molten silicon into said preform to produce an infiltrated product having the composition of said composite, said preform containing sufficient elemental carbon to react with said silicon to form said composite, said partial vacuum being at least sufficient to remove gas from said preform so as to allow said molten silicon to infiltrate said preform; and (g) cooling said product to produce said composite.

24. The process according to claim 23 wherein said silicon-wettable material is selected from the group consisting of elemental carbon, metal carbide, a metal which reacts with silicon to form a silicide thereof, a metal nitride and a metal silicide.

25. The process according to claim 23 wherein said composite has a porosity of less than about 1% by volume.

26. The process according to claim 23 wherein said elemental carbon ranges from about 10% by volume to about 100% by volume of the infiltration-promoting material.

27. The process according to claim 23 wherein said fibrous material is comprised of elemental carbon.

28. The process according to claim 23 wherein said fibrous material is comprised of silicon carbide.

29. The process according to claim 1 wherein said fibrous material is comprised of a combination of silicon carbide and elemental carbon.

30. The process according to claim 1 wherein said fibrous material is comprised of said SiC-containing material and said fibrous material envelops a core.

31. The process according to claim 1, wherein said infiltration-promoting material in step (c) contains molybdenum in an amount of at least about 1% by volume of said infiltration-promoting material.

32. The process according to claim 23, wherein said fibrous material is comprised of said SiC-containing material and said fibrous material envelops a core.

33. The process according to claim 23, wherein said infiltration-promoting material in step (c) contains molybdenum in an amount of at least about 1% by volume of said infiltration-promoting material.

34. The composite according to claim 9, wherein said fibrous material component is comprised of said SiC-containing material and said fibrous material component envelops a core.

35. The composite according to claim 9, wherein said matrix phase contains molybdenum silicide ranging up to about 50% by volume of the composite.

36. The composite according to claim 17, wherein said fibrous material component is comprised of said SiC-containing material and said fibrous material component envelops a core.

37. The composite according to claim 17, wherein said matrix phase contains molybdenum silicide ranging up to about 50% by volume of the composite.

38. A composite comprised of boron nitride-coated fibrous material and a matrix phase containing silicon carbide phase and elemental silicon phase, said silicon carbide phase being present in an amount of at least about 5% by volume of said composite, said elemental silicon phase being present in an amount of at least about 1% by volume of said composite, said fibrous material component of said boron nitride-coated material being present in an amount of at least about 5% by volume of said composite, said fibrous material component of said coated fibrous material being comprised of silicon carbide, said boron nitride coating being at least detectable by scanning electron microscopy, said composite having a porosity of less than about 20% by volume.

39. A composite comprised of boron nitride-coated fibrous material and a matrix phase containing silicon carbide phase and elemental silicon phase, said silicon carbide phase being present in an amount of at least about 5% by volume of said composite, said elemental silicon phase being present in an amount of at least about 1% by volume of said composite, said fibrous material component of said boron nitride-coated material being present in an amount of at least about 5% by volume of said composite, said fibrous material component of said coated fibrous material being comprised of elemental carbon, said boron nitride coating being at least detectable by scanning electron microscopy, said composite having a porosity of less than about 20% by volume.

40. A process for producing a composite with a porosity of less than about 20% by volume comprised of boron nitride-coated fibrous material and a matrix phase, said fibrous material component of said coated fibrous material comprising at least about 5% by volume of the composite, said matrix phase containing silicon carbide formed in situ in an amount of at least about 5% by volume of the composite and elemental silicon in an amount of at least about 1% by volume of the composite, which comprises the following steps:

(a) depositing boron nitride on a fibrous material producing a coating thereon which leaves no significant portion of said fibrous material exposed, said fibrous material being selected from the group consisting of elemental carbon, a SiC-containing material containing at least about 50% by weight silicon and at least about 25% by weight carbon, and a combination thereof;

(b) depositing a silicon-wettable material on said boron nitride-coated fibrous material producing a coating thereon which leaves no significant portion of said boron nitride exposed, said silicon-wettable material adhering to boron nitride sufficiently to form said coating thereon and being wetted by silicon sufficiently to produce said composite;

(c) forming a preform comprised of a mixture of the resulting coated fibrous material and an infiltration promoting material containing elemental carbon wherein the fibrous material component of said coated fibrous material comprises at least about 5% by volume of said mixture, said preform having an open porosity ranging from about 25% by volume to about 90% by volume of the preform;

(d) contacting said preform with silicon-associated infiltrating means whereby said silicon is infiltrated into said preform;

(e) heating the resulting structure in a partial vacuum to a temperature at which said silicon is molten and infiltrating said molten silicon into said preform to produce an infiltrated product having the composition of said composite, said preform containing sufficient elemental carbon to react with said silicon to form said composite, said partial vacuum being at least sufficient to remove gas from said preform so as to allow said molten silicon to infiltrate said preform; and (f) cooling said product to produce said composite.

41. The process according to claim 40, wherein said infiltration-promoting material is comprised of elemental carbon.

42. The process according to claim 40, wherein said fibrous material component is comprised of elemental carbon.

43. The process according to claim 40, wherein said fibrous material component is comprised of silicon carbide.

44. The process according to claim 40, wherein said fibrous material is comprised of said SiC-containing material and said fibrous material envelops a core.

45. The process according to claim 40, wherein said infiltration-promoting material in step (c) contains molybdenum in an amount of at least about 1% by volume of said infiltration-promoting material.

46. The process according to claim 40, wherein said fibrous material is comprised of said SiC-containing material and said fibrous material envelops a core, and wherein said infiltration-promoting material in step (c) contains molybdenum in an amount of at least about 1% by volume of said infiltration-promoting material.

47. The process according to claim 40, wherein said fibrous material is comprised of said Si-C containing material and said fibrous material envelops a core, and wherein said infiltration-promoting material in step (c) contains molybdenum in an amount of at least about 1% by volume of said infiltration-promoting material.

48. The process according to claim 40, wherein said infiltration-promoting material in step (c) contains molybdenum carbide in an amount of at least about 1% by volume of said infiltration-promoting material.

49. The process according to claim 40, wherein said infiltration-promoting material in step (c) contains molybdenum carbide in an amount of at least about 1% by volume of said infiltration-promoting material.

50. The process according to claim 1, wherein said fibrous material is comprised of said SiC-containing material and said fibrous material envelops a core, and wherein said infiltration-promoting material in step (c) contains molybdenum carbide in an amount of at least about 1% by volume of said infiltration-promoting material.

51. The process according to claim 40, wherein said fibrous material is comprised of said SiC-containing material and said fibrous material envelops a core, and wherein said infiltration-promoting material in step (c) contains molybdenum carbide in an amount of at least about 1% by volume of said infiltration-promoting material.

52. The composite according to claim 9, wherein said matrix phase contains molybdenum carbide ranging up to about 50% by volume of the composite.

53. The composite according to claim 9, wherein said fibrous material component is comprised of said SiC-containing material and said fibrous material component envelops a core, and wherein said matrix phase contains molybdenum carbide ranging up to about 50% by volume of the composite.

54. The composite according to claim 9, wherein said fibrous material component is comprised of said SiC-containing material and said fibrous material component envelops a core, and wherein said matrix phase contains molybdenum silicide ranging up to about 50% by volume of the composite.

* * * * *